United States Patent
Chen et al.

(10) Patent No.: US 10,503,683 B2
(45) Date of Patent: Dec. 10, 2019

(54) SERVICE REDIRECT OVER USB TYPE-C

(71) Applicant: Parade Technologies, Ltd., George Town, Grand Cayman (KY)

(72) Inventors: Jian Chen, Santa Clara, CA (US); Ming Qu, Santa Clara, CA (US); Baoquan Xu, Santa Clara, CA (US); Hongquan Wang, Shanghai (CN)

(73) Assignee: PARADE TECHNOLOGIES, LTD., Grand Cayman (KY)

( * ) Notice: Subject to any disclaimer, the term of this patent is extended or adjusted under 35 U.S.C. 154(b) by 741 days.

(21) Appl. No.: 14/948,177

(22) Filed: Nov. 20, 2015

(65) Prior Publication Data
US 2017/0147526 A1     May 25, 2017

(51) Int. Cl.
*G06F 13/42*     (2006.01)
*G06F 13/10*     (2006.01)
*G06F 13/20*     (2006.01)
*G06F 13/40*     (2006.01)

(52) U.S. Cl.
CPC .......... *G06F 13/4282* (2013.01); *G06F 13/20* (2013.01); *G06F 13/4068* (2013.01)

(58) Field of Classification Search
CPC .......... G06F 11/36; G06F 11/221; G06F 19/00
See application file for complete search history.

(56) References Cited

U.S. PATENT DOCUMENTS

| | | | | |
|---|---|---|---|---|
| 9,157,953 | B2* | 10/2015 | Bhatnagar | G01R 31/2844 |
| 2005/0182881 | A1* | 8/2005 | Chou | G06F 13/385 |
| | | | | 710/301 |
| 2006/0112700 | A1* | 6/2006 | Choi | F24F 11/30 |
| | | | | 62/126 |
| 2006/0273818 | A1* | 12/2006 | Takemoto | G01R 31/31926 |
| | | | | 324/762.02 |
| 2007/0208527 | A1* | 9/2007 | Lu | G01R 31/31907 |
| | | | | 702/120 |
| 2009/0326905 | A1* | 12/2009 | Cao | G01R 31/40 |
| | | | | 703/18 |
| 2015/0261714 | A1* | 9/2015 | Talmola | G06F 13/4081 |
| | | | | 710/313 |
| 2016/0124822 | A1* | 5/2016 | Remple | G06F 11/221 |
| | | | | 714/30 |

\* cited by examiner

*Primary Examiner* — Getente A Yimer
(74) *Attorney, Agent, or Firm* — Morgan, Lewis & Bockius LLP

(57) ABSTRACT

A service redirect operation mode allows a tester device to perform software burn-in, firmware upgrade, and other related device interrogation via a USB Type-C connection. The service redirect operation mode is implemented by modifying a termination state of the configuration channel pins of the USB Type-C receptacle of the device under test. Software and/or hardware executing on the device under test re-configure the resistive arrangement of the configuration channel pins, causing one pin to be connected to a reference voltage via a pull-up resistor and the other pin to be connected to ground via a pull-down resistor. When operating in the service redirect operating mode, two additional signal lines of the USB Type-C receptacles may be used to exchange information between the tester and the device under test using a user-specified interface protocol.

18 Claims, 4 Drawing Sheets

SERVICE REDIRECT OVER USB TYPE-C

TECHNICAL FIELD

The disclosure generally relates to operational modes of the USB Type-C communication standard.

BACKGROUND

The Universal Serial Bus (USB) standard defines cables, connectors, and communications protocols used in a bus for connection, communication, and control between computers and electronic devices. USB standardizes the connection of computer peripherals, such as keyboards, cameras, and printers, to computers, both for communication and for power supply. USB is now nearly ubiquitous, having been included in smartphones and video game consoles.

The USB standard specifies a variety of receptacles that can be used to connect computing equipment. Traditionally, the shape of a particular receptacle defined the role of its associated computing equipment within a connected network. For example, USB Type-A receptacles are installed in host controllers in computers and hubs, while USB Type-B receptacles are found in USB peripheral devices.

The advent of USB Type-C—in which a single compact receptacle is used by both a controller and a peripheral, is quickly propagating through the consumer electronics market. The role-agnostic design allows USB Type-C connectors to be inverted and reversed, making them much more convenient and versatile than previous versions of USB connectors.

SUMMARY

The versatility afforded by the role-agnostic features of the USB Type-C standard is used to implement an additional operating mode not supported by the USB Type-C standard. In the disclosed additional operating mode, a first device featuring a USB Type-C receptacle is configured to connect to a second device featuring a USB Type-C receptacle via a USB Type-C connector. The first device is configured to connect as a downstream facing port (DFP) on a first configuration channel pin (CC1) of a USB Type-C receptacle and as an upstream facing port (UFP) on another communication channel pin (CC2) of the USB Type-C receptacle. When configured in such a manner, the two sideband pins—SBU1 and SBU2—on each of the USB Type-C receptacles may be used to exchange information between the first device and the second device.

For example, in one embodiment the first device and the second device may be a test system comprised of a tester coupled to a device under test using a USB communication link. The device under test is configured to modify the termination state of two configuration channel lines of the USB Type-C connector by dynamically switching between pull-up and pull-down resistors coupled to CC1 and CC2. The device under test is further configured to detect the termination state of the configuration channel pins CC1 and CC2 on the receptacle on the tester side, and to programmatically switch the termination state on the device under test side in response. The device under test implements a hybrid termination state in which each of the two configuration channel lines in the USB Type-C connector is terminated differently at the device under test, with one configuration channel pin connected via a pull-up resistor to a reference voltage source and the other connected via a pull-down resistor to ground. When the device under test implements the hybrid termination state, the SBU1 and SBU2 pins on the USB Type-C connector included in the tester can be redirected to exchange user-specified data with the device under test. Example user-specified data may include test instructions and/or test data, or debug instructions and/or debug data. In other embodiments, the first device and the second device may be a computing device that includes software or firmware for updating another computing system via a USB communication link. In such an embodiment, the first device may implement the hybrid termination state to use the SBU1 and SBU2 pins to send software and/or firmware to the second device without having to open the chassis of the second device. More generally, the disclosed additional operating mode may be employed by computing devices coupled via a USB communication link to exchange data between the devices, send data from one device to the other device, or interrogate a device to retrieve specified information, without interfering with the operating modes defined in the USB Type-C standard.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Using Service Redirect for USB Type-C

USB Type-C connectors feature a number of pins, each configured to transmit signals for the purpose of communication between USB-enabled hosts and devices. These pins include a ground (GND) pin, configuration channel (CC) pins, and side-band use (SBU) pins. The USB Type-C connector features other pins which are not enumerated herein.

Figure 1:
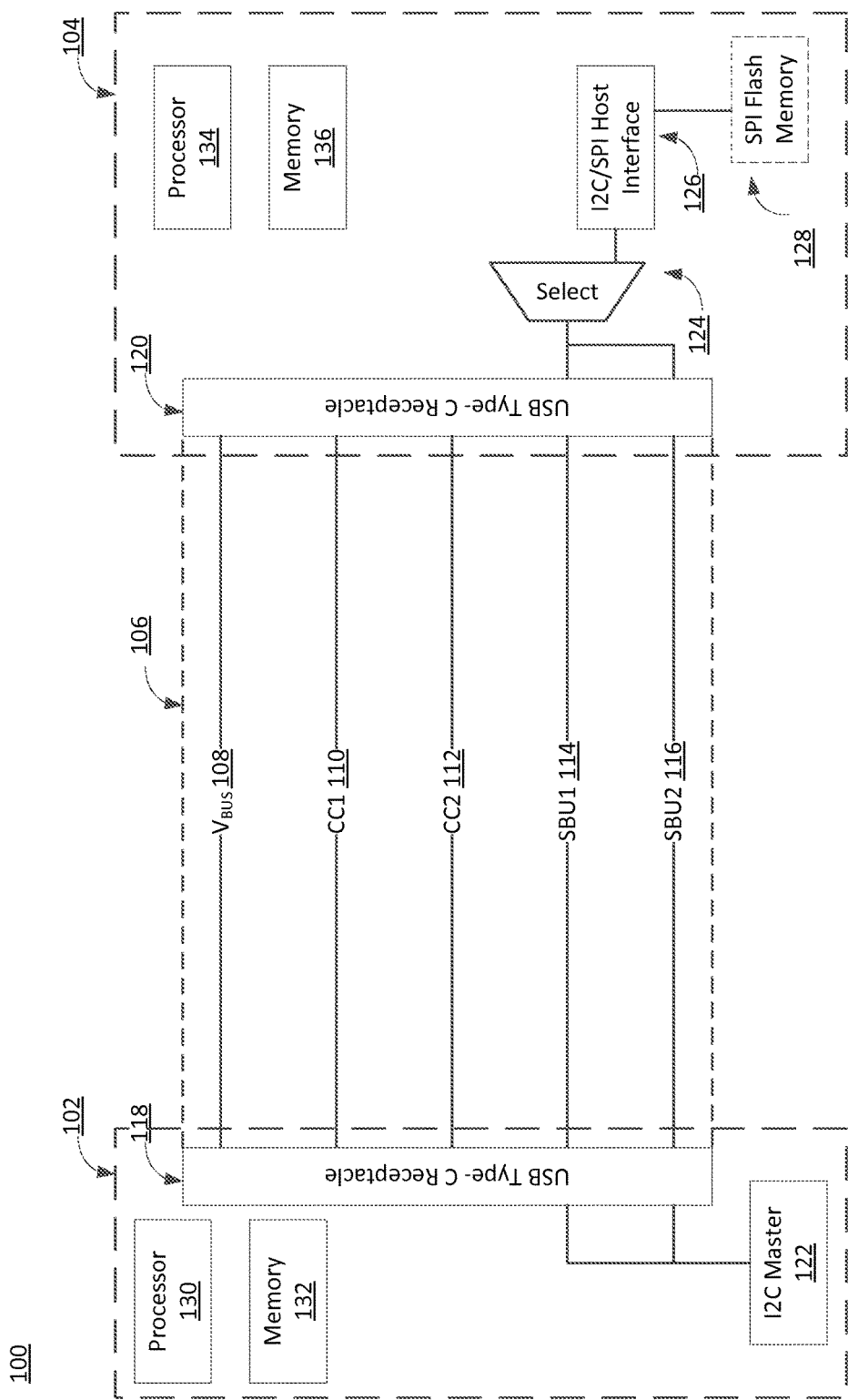
FIG. 1 is a block diagram illustrating a system coupled to communicate via a USB communication link using the service redirect operating mode, according to one embodiment.

FIG. 1 is a block diagram illustrating a system coupled to communicate via a USB communication channel using a service redirect operating mode, according to one embodiment. The system environment 100 includes a first computing device 102 and a second computing device 104 coupled to communicate over a USB cable 106. In one embodiment, the first computing device 102 is a host system that is a computing system or computing device that initiates communication across the USB cable 106. Example host systems include a smart phone, tablet computer, laptop, server or other device equipped with a processor and interface circuitry configured to initiate communication with another computing device. The first computing device 102 includes a processor 130, a memory 132, and a USB Type-C receptacle 118 also referred to herein and a USB Type-C connector. The processor 130 may be a general purpose processor or a processor specifically configured for operating the host system. In some implementations, the processor 130 may be multiple processing devices or multiple processing cores included in a single package. The memory 132 may be a non-transitory computer readable medium. Example types of memory 132 include non-volatile or volatile memory.

The USB Type-C receptacle 118 includes multiple pins for carrying signals in accordance with the USB Type-C standard. The USB Type-C receptacle 118 is connected via a USB cable 106 to another USB Type-C receptacle 120 included in the second computing device 104. The USB cable 106 includes a voltage bus line $V_{BUS}$ 108, a CC1 line 110, a CC2 line 112, a Side-band Use (SBU) 1 line 114, and a Side-band Use (SBU) 2 line 116 coupled to the USB Type-C receptacles on each end of the USB cable 106. The $V_{BUS}$ line 108 provides a reference voltage to the DUT 104, and is powered by circuitry contained within the tester 102 (not shown). The configuration channel lines CC1 110 and CC2 112 are configured to enable the first computing device 102 and second computing device 104 to configure their roles relative to one another. In typical embodiments, this may include assignment of host and peripheral roles to each device. The side-band use lines SBU1 114 and SBU2 116 are lower speed signal wires, which are typically allocated for alternate mode use. Operation and/or signaling of configuration channel lines CC1 110 and CC2 112 and side-band use lines SBU 114 and SBU 116 are configurable by either the first computing device 102 or the second computing device 104.

The second computing device 104 may be a device system such as a peripheral device. Example peripheral devices include a storage device, imaging device, pointing device, printer, or a computing system or computing device that responds to communications initiated by the first computing device 102. The second computing device 104 includes a processor 134 and a memory 136. The processor 134 may be a general purpose processor or a processor specifically configured for operating the device system. In some implementations, the processor 134 may be multiple processing devices or multiple processing cores included in a single package. The memory 136 may be a non-transitory computer readable medium. Example types of memory 136 include non-volatile or volatile memory.

In one implementation the system environment 100, the first computing device 102 is a tester device ("tester") and the second computing device is a device under test ("DUT"). In such an implementation, the SBU1 line 114 and SBU2 line 116 may be configured to operate as an I2C data bus, allowing the tester 102 and DUT 104 to connect and communicate in a master-slave configuration according to the specifications of the I2C communication protocol. In such an embodiment, the SBU1/SBU2 lines 114 are driven by an I2C master module 122 included within the tester 102. The I2C master module is implemented in software, firmware, hardware, or a combination thereof, and is configured to generate, transmit, and receive signals according to the Inter-Integrated Circuit (I2C) communication protocol. On the DUT 104 side, the SBU1/SBU2 lines 114 connect to a Select module 124. The Select module 124 may enable further connection with a host interface 126. The host interface 126, which may be implemented in software, firmware, hardware, or a combination thereof, may be configured to receive, transmit, and decode I2C signals from the I2C master module 122. The host interface 124 may be further configured to translate I2C signals into Serial-Peripheral Interface (SPI) signals, and transmit them to an SPI flash memory module 128.

Configuration Modes for Device Under Test: DFP and UFP

USB receptacles on USB-enabled computing devices are traditionally configured according to the role of the device. The configuration of the USB receptacle reflects the role of its associated device in relation to other connected devices. For example, a laptop computer connected via USB to a printer is configured to control the functions of the printer. The printer is configured to receive and act on commands sent by the laptop computer.

The respective USB receptacles on the laptop computer and printer are configured to reflect this relationship. The USB 3.1 interconnect system defines a USB receptacle (or "port") operating as a host as a downstream-facing port (DFP), and a USB receptacle operating as a device as an upstream-facing port (UFP).

Unlike existing USB Type-A and Type-B receptacles and plugs, the mechanical characteristics of the USB Type-C receptacle and plug do not inherently establish the relationship of USB host and device ports. The CC pins on the receptacle, configured to connect to the CC1 line 110 and CC2 line 112, also serve to establish an initial DFP-to-UFP and power relationships prior to the normal USB enumeration process.

For the purpose of defining how the CC1 line 110 and CC2 line 112 are used to establish the initial DFP-to-UFP relationship, multiple receptacle behavior modes are defined. The first is host-only, in which the port exclusively behaves as a DFP. The second is device-only, in which the port exclusively behaves as a UFP. The third is dual-role, in which the port can behave either as a DFP or as a UFP.

The host-only and device-only ports behaviorally map to traditional USB host ports and USB device ports, respectively. When a host-only port is attached to a device-only port, the behavior from the user's perspective follows the traditional USB host-to-device port model. However, the USB Type-C connector solution does not physically prevent host-to-host or device-to-device connections. In this case, the resulting host-to-host or device-to-device connection results in a safe but non-functional situation.

A port that supports dual-role operation by being able to shift to the appropriate connected mode when attached to either a host-only or device-only port is a dual-role port (DRP). In the special case of a DRP being attached to another DRP, an initialization protocol across the CC pins is used to establish the initial host-to-device relationship, and in this case, the determination of which is a DFP or a UFP is random from the user's perspective.

Establishing Port Roles Via CC Pins

For communication links that employ USB Type-C connectors, two pins on the connector, CC1 and CC2, are used to establish and manage the DFP-to-UFP connection. Generally, a DFP-UFP connection is a "direct connection," in which a device (e.g., a thumb drive) is connected directly to a host (e.g., a laptop computer). Functionally, the configuration channel is used to serve multiple purposes. These include (a) detection of attachment of USB ports (e.g., a DFP to a UFP), (b) resolving cable orientation and twist connections to establish USB data bus routing, (c) establishing UFP and DFP roles between two attached ports, and (d) discovering and configuring $V_{BUS}$ for power delivery. The configuration channel serves other purposes which are not enumerated herein.

The general concept for setting up a valid connection between a DFP and UFP is based on being able to detect terminations (i.e., resistors) residing in the device being attached to either end of the USB communication link. To aid in defining the functional behavior of a configuration channel, a pull-up ($R_p$) and pull-down ($R_d$) termination model is used. A USB Type-C receptacle configured as a DFP terminates both CC1 110 and CC2 112 to ground using pull-down resistors ($R_d$) as further described with reference to FIG. 2A. A USB Type-C receptacle configured as an UFP terminates both CC1 110 and CC2 112 to a reference voltage source using pull-up resistors ($R_p$) as further described with reference to FIG. 2B.

Figure 2A:
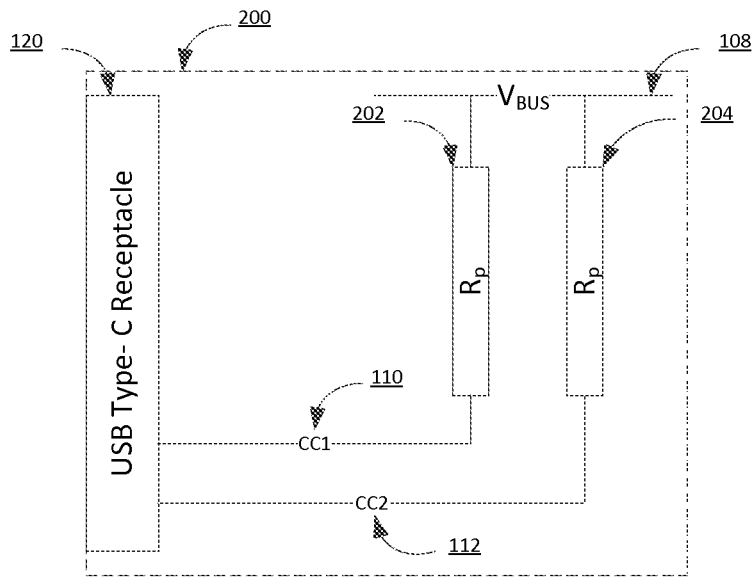
FIG. 2A is a diagram illustrating a device under test configured to operate as a downstream facing port, according to one embodiment.

FIG. 2A is a diagram illustrating a second computing device 104 configured to operate as a downstream facing port (DFP), according to one embodiment. The second computing device 104 includes the USB Type-C receptacle 120. The receptacle 120 includes pins coupled to configuration channel lines CC1 110 and CC2 112, respectively. CC1 110 is pulled up to $V_{BUS}$ 108 using a pull-up resistor $R_p$ 202. CC2 112 is pulled up to $V_{BUS}$ 108 using a pull-up resistor $R_p$ 204.

Figure 2B:
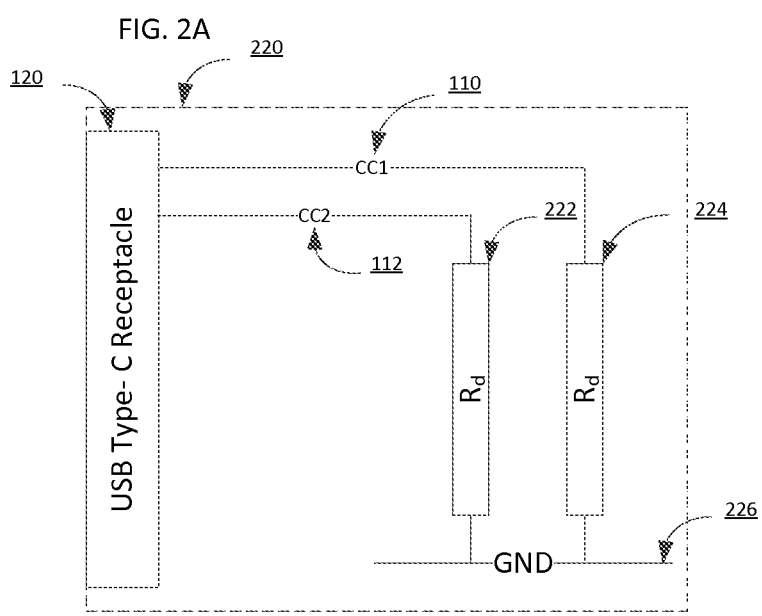
FIG. 2B is a diagram illustrating a device under test configured to operate as an upstream facing port, according to one embodiment.

FIG. 2B is a diagram illustrating a second computing device 104 configured to operate as an upstream facing port (UFP), according to one embodiment. The second computing device 104 includes the USB Type-C receptacle 120. Like the receptacle in the DFP configuration shown in FIG. 2A, the receptacle 120 includes pins coupled to configuration channel lines CC1 110 and CC2 112. However, in the UFP configuration CC1 110 is pulled down to GND 226 using a pull-down resistor $R_d$ 222 and CC2 112 is pulled down to GND 226 using a pull-down resistor $R_d$ 224.

Configuring an Unsupported Service Redirect Mode in a Device Under Test

As described earlier, a Type-C USB receptacle 120 of a DUT 104 may be configured to operate as an UFP or DFP, or DRP. The classification of the receptacle 120 is defined by the termination state of the configuration channel lines CC1 110 and CC2 112. The receptacle 120 supplies either pull-up resistors (in the case of DFP) or pull-down resistors (in the case of UFP). In certain embodiments, the receptacle 120 may dynamically configure the termination state of the configuration channel lines CC1 110 and CC2 112. In this case, the receptacle 120 is classified as a dual-role port (DRP).

Figure 3:
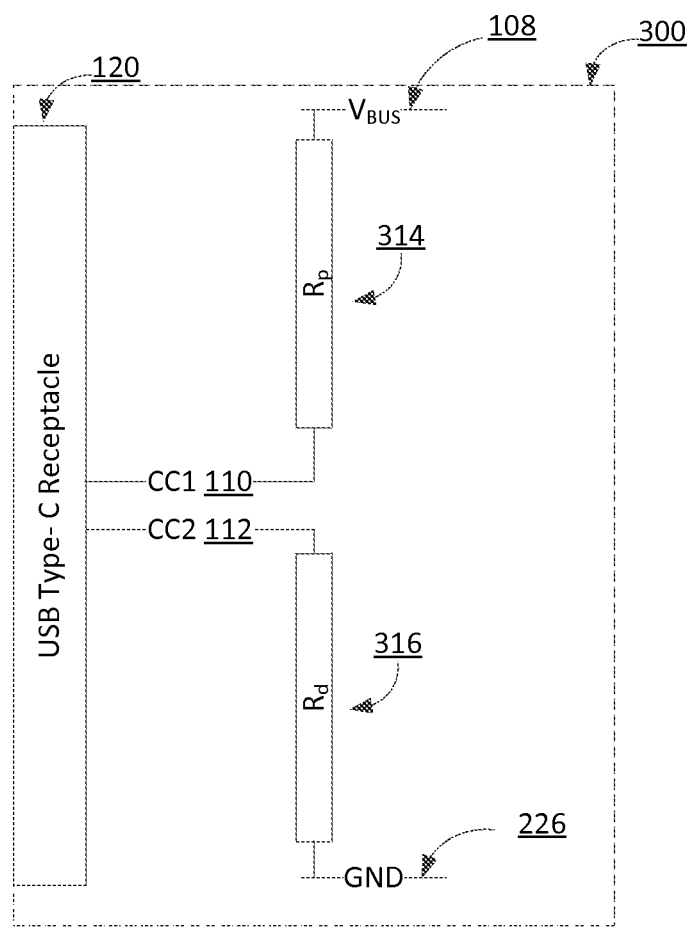
FIG. 3 is a diagram illustrating a device under test configured to operate in the service redirect operating mode, according to one embodiment.

The receptacle 120 is configured by the DUT 104 to execute an undefined mode described herein as a service redirect operating mode. To enable the service redirect operating mode, the DUT may be configured to implement one of multiple operating states, as described with reference to FIG. 4, by means of firmware, software, or hardware, or any combination thereof. On the tester 102 side, a hardware configuration (as shown in FIG. 3), or a more sophisticated implementation, such as is implemented by the DUT 104, may enable the service redirect operation mode. During the service redirect operating mode, the DUT 104 separately configures how each of its two configuration channel lines CC1 110 and CC2 112 is terminated to either ground or a reference voltage source, such that one line is terminated with a pull-down resistor and the other with a pull-up resistor. Such a termination scheme forms contradictory roles for the DUT 104, such that one of the CC lines is configured as a UFP and the other CC line is configured as a DFP. When configured in such a manner, the two sideband pins—SBU1 and SBU2—on each of the USB Type-C receptacles 118 and 120 may be used to exchange information between the tester 102 and the DUT 104. The termination connection scheme employed during a service redirect operating mode is not defined by the USB 3.1 specification, USB Type-C specification revision 1, or USB Type-C Port Controller Revision 1.0. In some embodiments, this reconfiguration is performed by one or more hardware components included in the DUT 104. While in other embodiments, the reconfiguration is performed by one or a combination of firmware, software, and hardware executing on the DUT 104.

FIG. 3 is a diagram illustrating a device under test 104 configured to operate in a service redirect mode, according to one embodiment. The DUT 104 includes the USB receptacle 120. The receptacle 120 includes pins connected to configuration channel lines CC1 110 and CC2 112. CC1 110 is pulled up to $V_{BUS}$ 108 using a pull-up resistor $R_p$ 314, while CC2 112 is pulled down to GND 226 using a pull-down resistor $R_d$ 316. In some embodiments, this configuration may be referred to as a hybrid configuration; the DUT 104 is able to connect as a DFP on line CC1 110 and as a UFP on line CC2 112.

In some embodiments, the hybrid configuration described with reference to FIG. 3 may be performed programmatically, responsive to detection by the DUT 104 of a termination configuration of the tester 102. In one embodiment, a tester 102 is connected via a USB Type-C cable 106 to a DUT 104, the DUT 104 featuring a USB Type-C receptacle 120 configured as a DFP. As described previously with reference to FIG. 2A, in the DFP configuration, both lines CC1 110 and CC2 112 of the USB receptacle are connected to $V_{BUS}$ 108 via pull-up resistors $R_p$ 202 and 204. Responsive to detection of the cable attach, the DUT 104 may programmatically switch the termination of one of the CC lines—for example, by disconnecting $R_p$ 202 from CC1 110 and instead connecting it to GND 226 via a pull-down resistor. If the tester 102 has terminated its end of line CC1 110 with a pull-up resistor, then DUT 104 would detect CC1 110 as having a UFP configuration. This would complete the transition of the DUT 104 into the hybrid configuration, as described previously, allowing it to operate in the unsupported service redirect mode.

In another embodiment, a tester 102 is connected via a USB Type-C cable 106 to a DUT 104, the DUT 104 featuring a USB Type-C receptacle 120 configured as a UFP. As described previously with reference to FIG. 2B, in the UFP configuration, both lines CC1 110 and CC2 112 of the USB receptacle 120 are connected to GND 226 via pull-down resistors $R_d$ 222 and 224. Responsive to detection of the cable attach, the DUT 104 may programmatically switch the termination of one of the CC lines—for example, by disconnecting Rd 222 from CC1 110 and instead connecting it to $V_{BUS}$ 108 via a pull-up resistor. If the tester 102 has terminated its end of line CC1 110 with a pull-down resistor, then DUT 104 would detect CC1 110 as having a DFP configuration. Just as in the previous example, this action would complete the transition of the DUT 104 into the hybrid configuration, allowing it to operate in the unsupported service redirect mode.

In still another embodiment, a tester 102 is connected via a USB Type-C cable 106 to a DUT 104, the DUT 104 featuring a USB Type-C receptacle 120 capable of operating as a dual-role port (DRP). Responsive to detection of the cable attach, the DUT 104 may attempt to determine the termination state of lines CC1 110 and CC2 112 on the side of the tester 102. If the DUT 104 determined that one of the lines is configured as a UFP and the other is configured as a DFP, then the DUT would enter the hybrid configuration.

Figure 4:
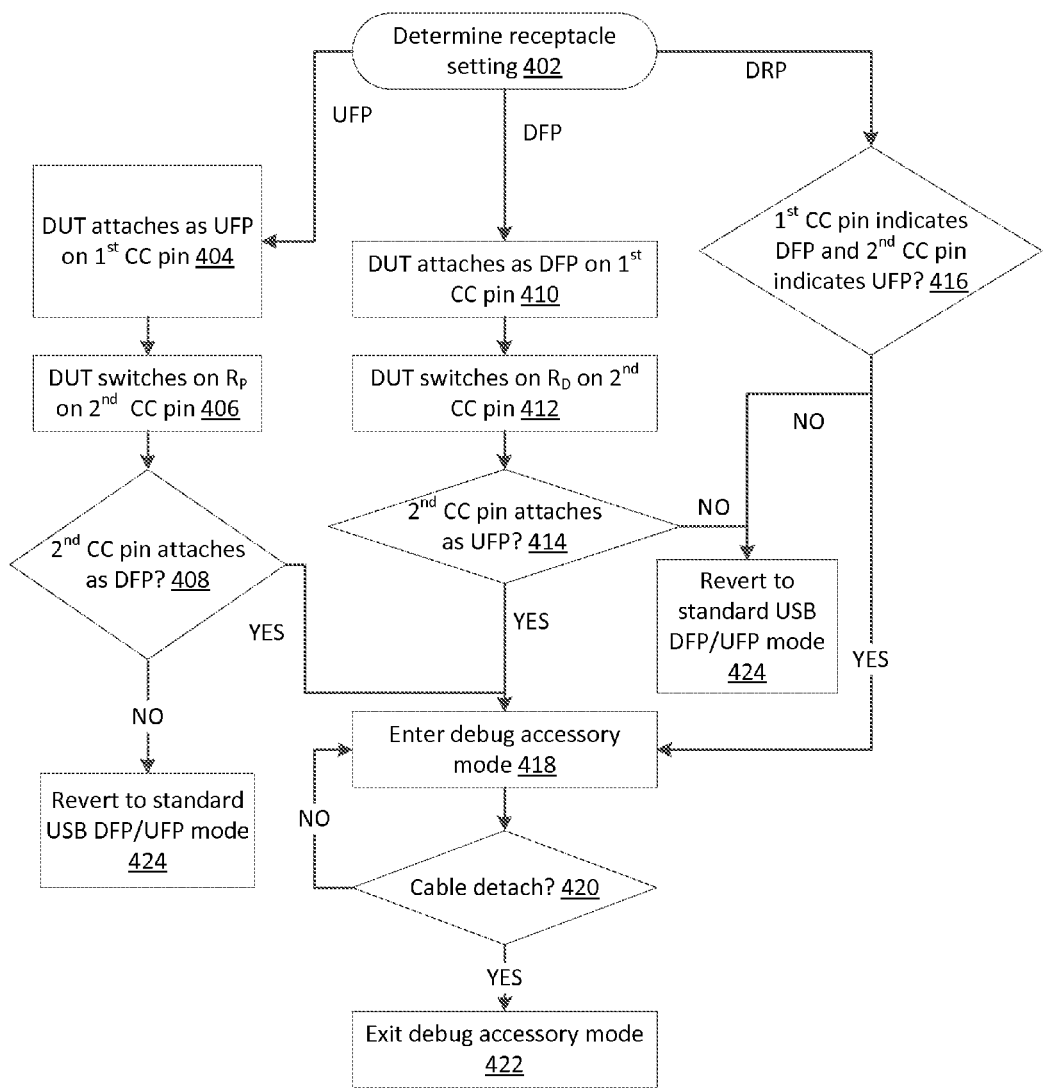
FIG. 4 is a flowchart illustrating a process by which a device under test enters a redirect operating mode, according to one embodiment.

FIG. 4 is a flowchart illustrating a process by which a device under test enters a service redirect mode, according to one embodiment. The DUT 104 first determines the configuration of the USB receptacle 120. If the receptacle 120 is configured as a UFP, the DUT 104 attaches 404 as a UFP on a first CC pin. The DUT 104 then switches on 406 a pull-up resistor $R_p$ on the second CC pin. The DUT 104 determines 408 if the second CC pin attaches as a DFP. If it does, then the DUT 104 enters 418 the service redirect mode. If it does not, the DUT 104 waits or terminates after a specified length of time and then reverts 424 to the normal USB type-C operating mode (either USB or DFP) indicated by the first CC connection.

Returning to step 402, if the DUT 104 determines that the USB receptacle 120 is configured as a DFP, the DUT attaches 410 as a DFP on a first CC pin. The DUT 104 then switches 412 on a pull-down resistor $R_d$ on the second CC pin. The DUT 104 determines 414 if the second CC pin attaches as a UFP. If it does, then the DUT 104 enters 418 the service redirect mode. If it does not, the DUT 104 waits or terminates after a predetermined length of time and reverts 424 to the normal USB type-C operating mode (either USB or DFP) indicated by the first CC connection.

Returning to step 402, if the DUT 104 determines that the USB receptacle 120 is configured as a dual-role port (DRP), the DUT determines 416 if, on the tester 102 side, a first CC pin is configured as a DFP and a $2^{nd}$ CC pin is configured as a UFP. If they are, the DUT 104 enters 418 the service redirect mode. If not, the DUT 104 waits or terminates after a predetermined length of time and reverts 424 to the normal USB type-C operating mode (either USB or DFP) indicated by the first CC connection.

Once the DUT 104 enters 418 the service redirect mode, the DUT 104 continually determines 420 if the USB cable 106 has been attached. The DUT 104 may check continuously or periodically. If the DUT 104 does not detect a cable detach, the DUT 104 remains in the service redirect mode. If the DUT 104 does detect a cable detach, the DUT exits 422 the service redirect mode. The DUT 104 may also exit the service redirect mode after a specified length of time, or upon direction from software executing on the DUT 104 itself, without waiting to detect a cable detach.

Applications of Service Redirect Mode

The service redirect mode, as described above, allows an operator of the tester device 102 to interact with the DUT 104. In typical embodiments, once the USB receptacle 120 of the DUT 104 has implemented the hybrid termination configuration as described previously, the tester 102 may transmit signals over the side-band use lines, SBU 1 114 and SBU 2 116 for purposes of interrogation and re-configuration.

In one example embodiment, the tester 102 may transmit debug commands, originating from the I2C master module 122. These debug commands are transmitted over the side-band use lines SBU1 114 and SBU 2 116. On the DUT side, the select module 124 may direct the I2C signals to a host interface 126.

In still another example embodiment, the tester 102 may perform an upgrade of firmware stored on the DUT 104. Subsequent to initiation of the service redirect mode by the DUT 104, the tester 102 may again transmit I2C commands originating from the I2C master module 122. These I2C commands are transmitted over lines SBU1 114 and SBU2 116. The host interface 126 on the DUT 104 may translate these signals into Serial-Peripheral Interface (SPI) format, and enter them into memory (not shown).

In still another embodiment, the I2C master module 122 on the tester 102 may be replaced by a Serial Wire Debug (SWD) module. In this situation, the lines SBU1 114 and SBU2 116 are redirected to carry the SWD clock (SWD-CLK) and SWD input/output (SWDIO) signals. Using this method, the tester 102 may upgrade the firmware of the DUT 104 without opening the chassis associated with the DUT 104.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion embodied as executable instructions or code) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms, state machines, or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed embodiments. This description should be read to include one or at least one and the singular also includes the plural unless it is obvious that it is meant otherwise.

Upon reading this disclosure, those of skill in the art will appreciate still additional alternative structural and functional designs for a system and method for establishing a service redirect operation mode through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described.

What is claimed is:

1. A method, comprising:
    at a device, wherein the device is configured to be tested by a tester, and the device includes a universal serial bus (USB) receptacle having a first configuration channel pin, a second configuration channel pin, and one or more signal pins:
    determining whether a first resistor coupled to the first configuration channel pin is coupled to ground or a reference voltage;
    determining whether a second resistor coupled to the second configuration channel pin is coupled to ground or the reference voltage;
    in accordance with a determination that both the first resistor and the second resistor are coupled to ground, decoupling a first terminal of the second resistor from ground and coupling the first terminal of the second resistor to the reference voltage, thereby establishing a hybrid termination configuration in which the first and second configuration channel pins are coupled to separate ones of ground and the reference voltage via a respective resistor;
    in accordance with a determination that both the first resistor and the second resistor are coupled to the reference voltage, decoupling the first terminal of the second resistor from the reference voltage and coupling the first terminal of the second resistor to ground, thereby establishing the hybrid termination configuration for the first and second configuration pins;
    determining whether a USB cable is attached to the USB receptacle to connect the device to the tester and checking attachment of the USB cable continuously or periodically;
    in accordance with a determination that the USB cable is attached to the USB receptacle to connect the device to the tester and a determination that the hybrid termination configuration is enabled for the first and second configuration pins, establishing a communication channel between the device and the tester via the one or more signal pins of the USB receptacle and enabling a service redirect mode that allows the tester to interact with the device; and in accordance with a determination of a cable detach of the USB cable, exiting by the device the service redirect mode, thereby disabling the device from interacting with the tester.

2. The method of claim 1, wherein the USB cable provides a USB communication link including one or more signal lines, and the one or more additional pins of the USB receptacle are coupled to the one or more signal lines of the USB communication link, and wherein the one or more signal lines of the USB communication link include side-band use signal lines.

3. The method of claim 2, wherein the one or more additional signal lines are configured to transmit signals according to a user-specified serial interface protocol.

4. The method of claim 3, wherein the user-specified serial interface protocol includes Inter-Integrate Circuit protocol.

5. The method of claim 3, wherein the user specified serial interface protocol includes Serial Wire Debug protocol.

6. The method of claim 2, wherein the one or more additional signal lines include a clock signal and an input/output data signal.

7. The method of claim 1, further comprising:
in accordance with the service redirect mode, receiving debug commands via one or more signal lines of the communication channel coupled to the one or more signal pins.

8. The method of claim 1, further comprising:
in accordance with the service redirect mode, performing an upgrade of firmware stored on the device.

9. The method of claim 1, further comprising:
in accordance with the service redirect mode, receiving from the tester one or more commands formatted according to a predetermined interface protocol;
translating the one or more commands into a serial-peripheral interface format; and
storing the one or more commands in a memory.

10. The method of claim 1, further comprising:
exiting by the device the service redirect mode after a predetermined length of time, thereby disabling the device from interacting with the tester.

11. The method of claim 1, further comprising:
in accordance with an instruction from a software program executed on the device, exiting by the device the service redirect mode, thereby disabling the device from interacting with the tester.

12. A method, comprising:
at a device, wherein the device is configured to be tested by a tester, and the device includes a universal serial bus (USB) receptacle having a first configuration channel pin, a second configuration channel pin, and one or more signal pins:
determining whether a first resistor coupled to the first configuration channel pin is coupled to ground or a reference voltage;
determining whether a second resistor coupled to the second configuration channel pin is coupled to ground or the reference voltage;
in accordance with a determination that both the first resistor and the second resistor are coupled to ground, decoupling a first terminal of the second resistor from ground and coupling the first terminal of the second resistor to the reference voltage, thereby establishing a hybrid termination configuration in which the first and second configuration channel pins are coupled to separate ones of ground and the reference voltage via a respective resistor;
in accordance with a determination that both the first resistor and the second resistor are coupled to the reference voltage, decoupling a first terminal of the first resistor from the reference voltage and coupling the first terminal of the first resistor to ground, thereby establishing the hybrid termination configuration for the first and second configuration pins;
determining whether a USB cable is attached to the USB receptacle to connect the device to the tester and checking attachment of the USB cable continuously or periodically;
in accordance with a determination that the USB cable is attached to the USB receptacle to connect the device to the tester and a determination that the hybrid termination configuration is enabled for the first and second configuration pins, establishing a communication channel between the device and the tester via the one or more signal pins of the USB receptacle and enabling a service redirect mode that allows the tester to interact with the device; and
in accordance with a determination of a cable detach of the USB cable, exiting by the device the service redirect mode, thereby disabling the device from interacting with the tester.

13. The method of claim 12, wherein the USB cable provides a USB communication link including one or more signal lines, and the one or more additional pins of the USB receptacle are coupled to the one or more signal lines of the USB communication link, and wherein the one or more signal lines of the USB communication link include side-band use signal lines.

14. The method of claim 13, wherein the one or more additional signal lines are configured to transmit signals according to a user-specified serial interface protocol.

15. The method of claim 14, wherein the user-specified serial interface protocol includes Inter-Integrate Circuit protocol.

16. A device, comprising:
a universal serial bus (USB) receptacle having a first configuration channel pin, a second configuration channel pin, and one or more signal pins, wherein the device is configured to be tested by a tester;
a processor; and
a non-transitory computer readable storage medium comprising instructions for:
determining whether a first resistor coupled to the first configuration channel pin is coupled to ground or a reference voltage;
determining whether a second resistor coupled to the second configuration channel pin is coupled to ground or the reference voltage;
in accordance with a determination that both the first resistor and the second resistor are coupled to ground, decoupling a first terminal of the second resistor from ground and coupling the first terminal of the second resistor to the reference voltage, thereby establishing a hybrid termination configuration in which the first and second configuration channel pins are coupled to separate ones of ground and the reference voltage via a respective resistor;
in accordance with a determination that both the first resistor and the second resistor are coupled to the reference voltage, decoupling the first terminal of the second resistor from the reference voltage and coupling the first terminal of the second resistor to ground, thereby establishing the hybrid termination configuration for the first and second configuration pins;

determining whether a USB cable is attached to the USB receptacle to connect the device to the tester and checking attachment of the USB cable continuously or periodically;

in accordance with a determination that the USB cable is attached to the USB receptacle to connect the device to the tester and a determination that the hybrid termination configuration is enabled for the first and second configuration pins, establishing a communication channel between the device and the tester via the one or more signal pins of the USB receptacle and enabling a service redirect mode that allows the tester to interact with the device; and in accordance with a determination of a cable detach of the USB cable, exiting by the device the service redirect mode, thereby disabling the device from interacting with the tester.

17. The device of claim 16, wherein the USB receptacle is a USB Type-C receptacle.

18. The device of claim 16, wherein the USB cable provides a USB communication link including one or more signal lines, the one or more additional pins of the USB receptacle are coupled to the one or more signal lines of the USB communication link, and the one or more signal lines of the USB communication link include side-band use signal lines.

* * * * *